Feb. 29, 1944.  A. C. HOFFMAN  2,342,669
FLUID STRAINER OR FILTER
Filed July 5, 1940
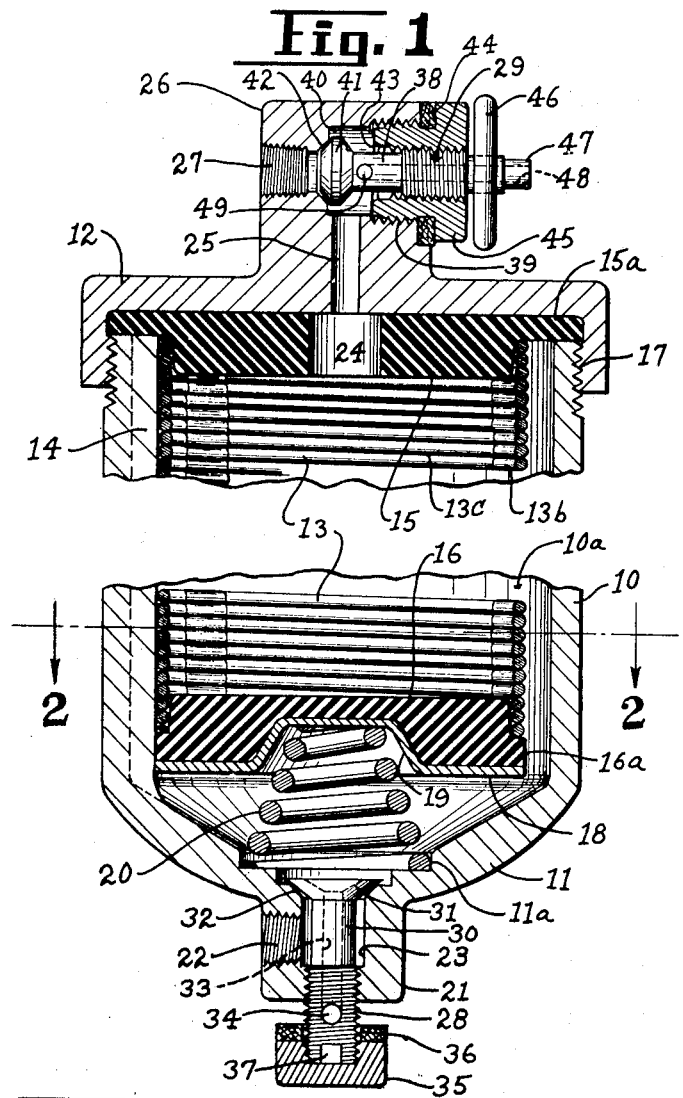
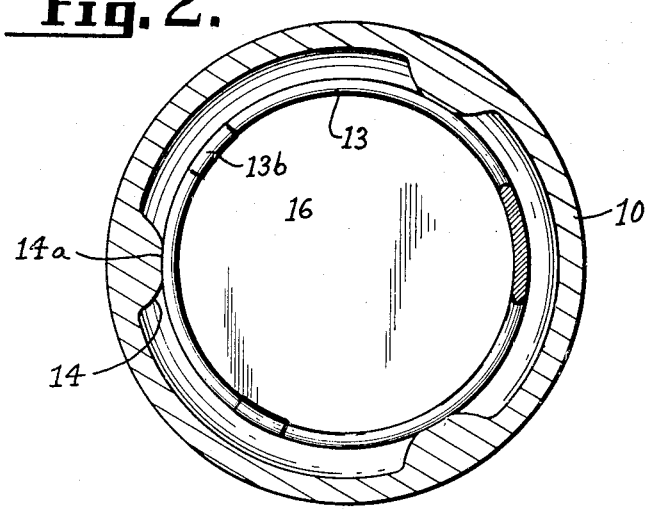
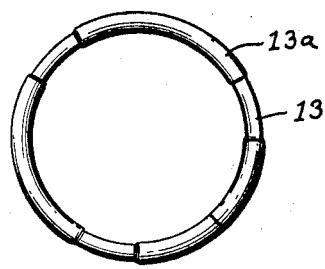
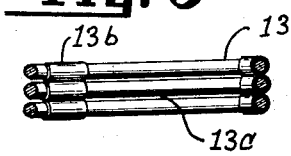
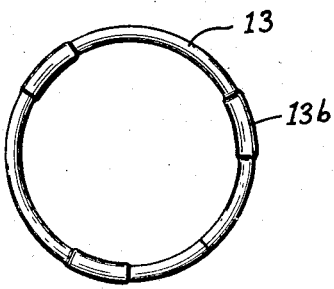
INVENTOR
Allen C. Hoffman Patented Feb. 29, 1944

2,342,669

UNITED STATES PATENT OFFICE 2,342,669

FLUID STRAINER OR FILTER

Allan C. Hoffman, Dayton, Ohio

Application July 5, 1940, Serial No. 344,013

4 Claims. (Cl. 210—166)

This invention pertains to filters for fluids for the purpose of effecting mechanical separation of solids from fluids or fluids from fluids, and particularly to a filter in which the separation is effected through a filter coil.

The principal object of this invention is to construct a filter coil in the most inexpensive manner wherein the finished coil in the specific illustration herein will have its several helices provided with segmental portions of large and small diameters and wherein the large diameter segments are disposed in abutting relationship one above the other and the remaining segmental portions of small diameter being disposed in spaced relationship to provide numerous interstices of a minute character through which the fluid is filtered.

A further object resides in providing a method of obtaining the segmental interstices in the manufacture of the coil whereby the size of the interstices can be readily controlled for various adaptations to which the filter may be used.

A further object is to provide a casing for receiving the filter coil and in which the latter is held secure and in a fixed predetermined relationship, and wherein the numerous helices of the coil are held under resilient axial compression to assure a uniform size of the filtering interstices under all conditions.

A further object is to provide a means for thoroughly cleaning the filter without disassembling or disturbing the filter element or necessitating the detachment of the filter unit from the device to which it is applied, and which cleaning operation is accomplished by the simple expedient of fluid pressure. In the present disclosure this means includes shut-off valves designed to operate to preclude any sediment being forced back into the discharge and feed lines when in one position and to prevent leakage through the threaded portions of the valve structure when in the opposite position.

With the above and other objects in view a preferred embodiment of the invention selected for the purpose of illustration is shown in the accompanying drawing in which Fig. 1 shows a longitudinal sectional view of the filter device embodying this invention.

Fig. 2 is a transverse sectional view taken on line 2—2 of Fig. 1.

Fig. 3 is a vertical sectional view through a portion of the filter coil showing portions of each helix masked preliminary to a plating operation.

Fig. 4 is a plan view of the same.

Fig. 5 is a similar view to Fig. 3 showing the helices as completed with the masked sections stripped and further showing the helices in compressed relationship, and Fig. 6 is a plan view of the same.

Referring now to the drawing wherein like numerals designate like parts throughout the several views, the numeral 10 indicates a body or casing having a tapering base 11 and its open end closed by a screw cap or cover 12. A helical wire filter coil 13 is received within the chamber 10a of the casing 10 and is concentrically located therein by means of a plurality of longitudinal ribs 14 integral with the inner wall of the casing and preferably equally spaced thereabout. To assure a more perfect fit for the filter coil 13 within the casing 10, it may be desirable to ream off the crown portion of the ribs 14 at 14a as best shown in Figure 2.

Filter coil construction

The particular manner in which the filter coil is made forms one of the principal features of this invention and a more detailed description of the same will be given herewith. The preferred method of attaining a difference in the diametrical size of the segmental portions of the helices in the filter coil 13 is by a plating operation. Specifically the wire of the coil 13 is preferably of round cross section, and predetermined portions may be blocked or masked off by a dielectric material, preferably a lacquer, commonly used in plating and indicated by the numeral 13a in Figures 3 and 4.

In commercial practice the bare wire, either straight or coiled, would be insulated against plating by masking uniformly spaced portions of the wire as shown in Figures 3 and 4 so that the masked portions of one turn of the coil will lie juxtaposed with the correspondingly masked portions of adjacent coils and the unmasked portions will correspondingly align themselves. As shown in Figure 4 it is preferable to mask each individual coil in three equal sections for the reason hereinafter described, the length of the masked portions being preferably longer than the unmasked portions. This sectional masking of the coil may be accomplished in several ways. One simple way for the purpose of illustration would be to use a cylindrical stencil longitudinally slotted at three equally spaced points. This stencil would have complementary internal and external parts to fit inside and outside the coil. Then by the use of suitable spraying equipment the exposed aligned sections of the coil would be spray coated with lacquer forming the mask 13a.

After this lacquer has dried the coil is placed in a plating bath such as chromium or the like and the plating material is deposited on the uncoated sections as indicated by the numeral 13b in Figures 5 and 6. As will be obvious to those skilled in the art of plating, the thickness of the deposit can be closely controlled by adjustment of the electrolyte, current and time. By actual experiment a deposit of three ten thousandths of an inch (.0003″) in ten minutes has been secured. By increasing or decreasing this time element alone the thickness of the deposit may be varied and accurately controlled for predetermined sizes.

After the deposit of plating material has been made the mask may readily be dissolved off the helices by using a suitable solvent. Then, as shown in Figures 5 and 6, by compressing the helices together the thicker plated sections 13b of the wire where the plating has taken place will abut and carry the compressing load leaving the unplated sections spaced apart by a distance equal to twice the deposit of plated material. This spacing forms the fine interstices 13c heretofore mentioned.

From the foregoing description it is seen that the main part of the filter is a single piece of wire easily and cheaply manufactured to precise dimensions. The coils are plated at three sections because this is the geometrically correct method to carry the compressing force acting on the coil.

Other methods of effecting this three point plating will be obvious. Furthermore it is possible to reduce the diameter of the wire by acid etching. In this case an acid resistant lacquer is applied at three places on each helix and the unprotected sections of the wire are reduced in diameter by action of the acid. Then by dissolving off the lacquer and compressing the spring the unetched sections will abut and carry the load with the interstices therebetween in a manner identical to the plating method.

*Filter casing assembly*

In order to hold the filter coil 13 under a uniform pressure and seal the opposite ends thereof when in an assembled state within the casing 10, provision is made of a pair of cap-like plugs 15 and 16 made preferably of synthetic molded rubber material. The body portions of the plugs proper are slightly tapered as shown in Figure 1 to facilitate the assembly and effect a tight engagement with the adjacent surrounding helices of the coil 13. The upper plug 15 is supported against the inner face of the cap 12 and is formed with a relatively large peripheral flange 15a against which the uppermost helix of the coil 13 abuts as a stop. The outer edge of the flange 15a further serves as a sealing washer between the edge of the casing 10 and the cover 12 when the latter is assembled and tightly screwed into position by threads 17. The lower plug 16 is provided with a relatively smaller peripheral flange 16a for supporting the lowermost helix of the coil 13 and the entire plug is supported by a metal backing plate 18 having a central countersunk recess 19 for the reception of the smaller end of a conical compression spring 20. The large end of the spring 20 seats in a complementary recess 11a formed in the base 11 of casing 10. The spring 20 is sufficiently strong not only to support the filter coil assembly (parts 13, 15, 16 and 18) but also to keep all the individual helices of the coil 13 tightly compressed with the adjacent plated sections 13b of each helix tightly abutting against each other and carrying the full weight of the compression load and assuring the predetermined spacing of the adjacent helices.

The fluid to be filtered is directed into the casing 10 at the base thereof in the customary manner. Specifically the casing base 11 is formed with a depending boss 21 having a tapped lateral opening 22 communicating with a central bore 23 within the boss 21. An inlet pipe not shown may be connected into the tapped opening 22 in the usual manner. The fluid that has been filtered through the coil unit, as will be more fully described in the operation, is directed out through a relatively large opening 24 in the upper plug 15 aligned with a small bore 25 within an upstanding boss 26 formed as an integral part of the cover 12. A lateral tapped opening 27 connects into bore 25 and a suitable outlet pipe connection may be made into said opening 27 through which the filtrate may be directed back to its source.

*Shut-off valves*

In order to fulfill another stated object of this invention, provision is made to exhaust the fluid in the chamber 10a and clean all deleterious foreign material that may have accumulated therewithin. To accomplish such it is necessary to provide two shut-off valves, one at each end of the filter generally indicated by numerals 28 and 29. The lower valve 28 comprises a valve stem 30 threadedly engaged in a tapped hole in boss 21 aligned with the bore 23. The inner end of the stem 30 carries a valve head 31 adapted to engage a valve seat 32 formed at the upper end of bore 23. The sediment that is to be discharged from the filter during the cleaning operation is exhausted through a central passage 33 in stem 30 out through a lateral opening 34 intersecting said passage 33. The operation of the valve 28 is effected by a nut 35 threaded to the outer end of the stem 30. When the valve 28 is in open or normal operating position the valve stem is screwed into its innermost position and the valve head 31 is removed from the seat 32 by means of the nut 35. The nut 35 then assumes a position against the face of the boss 21 with a sealing washer 36 compressed therebetween to effect a seal. In case the nut fails to operate the stem, a screw drive slot 37 is provided in the outer end of said stem 30.

The upper valve 29 comprises a valve stem 38 threadedly engaged in a bushing 39 which in turn is threaded into the tapped section of a lateral valve chamber 40 in boss 26 and communicating with bore 25. The inner end of the stem 38 supports a double headed valve 41, the innermost inclined face of which seats against a valve seat 42 formed at the juncture of the outlet opening 27 and the valve chamber 40 when the valve is closed for flushing the filter. When the valve is in its normal operating position the opposite inclined face of the valve head 41 is seated against a valve seat 43 formed at the innermost end of the bushing 39 and prevents any leakage of fluid through the tapped hole of bushing 39. A washer 44 is interposed between the head end 45 of the bushing 39 and the adjacent flattened face of the boss 26 to preclude leakage therebetween. The valve 29 is operated by means of a lever or hand wheel 46 secured to the end of stem 38.

In order to introduce fluid into the filter for purposes of cleaning, the outer end of the stem 38 is provided with a suitable nipple 47 to which fluid pressure means may be connected and directed into the valve chamber 40 through a central passageway 48 intersecting a lateral opening 49 in said stem 38.

Operation

In operation the fluid to be filtered enters at the pipe connection 22 in boss 21. Valve 28 and valve stem 30 are screwed up into the boss 21 until washer 36 and nut 35 seat tightly against lower end of boss 21 sealing the opening 34 against the outside. The fluid is therefore able to enter the casing 10 and fills up the space 10a surrounding the coil 13. Since the fluid is under pressure it will be forced through the interstices 13c between the helices. Then it will travel up through openings 24 and 25. The valve 29 and valve stem 38 will be screwed to the position where valve 41 seats against valve seat 43. When in this position the outlet connection 27 is open and the filtered fluid can be returned for further use.

During the passage of the oil through the coil 13 solids larger than the interstices 13c are trapped on the outside of the coil 13 where they remain until dislodged by vibration or until they are removed entirely from the filter during the cleaning operation.

To clean the filter both valves 28 and 29 are screwed into position shown in Figure 1. Fluid pressure is applied at 47 which forces fluid through the openings 48, 49, 40, 25 and 24 to the inside of coil 13. This counter-flow pressure forces the fluid inside the coil 13 out through the interstices 13c between the helices carrying with it any accumulated solids.

Meanwhile nut 35, washer 36, valve stem 30 and valve head 31 have been screwed outwardly from the boss 21 of the casing 10 until valve head 31 seats tightly against valve seat 32. This opens passageway 33 and lateral opening 34 to the outside and closes pipe connection opening 22. Continued pressure at nipple 47 forces the unfiltered fluids and accumulated solids out through the valve stem 30 and opening 33 and 34.

When this flushing operation has been completed the valve head 31 is opened until washer 36 and nut 35 seat securely against boss 21 and valve 41 is unseated from its seat 42 and seated at its seat 43. The filter is now in position to resume its normal function.

From the foregoing, it will be seen that the invention provides a novel, simple and improved filter which will ably perform the objects set forth and it will be understood that numerous changes, modifications and the full use of equivalents may be resorted to in carrying out this invention, without departing from the spirit and scope of the appended claims.

What I claim is:

1. In a filter, a casing having an open end and a closed end provided with a fluid inlet, an expansible and compressible metallic wire filter element disposed in said casing and having a length when in its expanded condition greater than the internal limits of the casing between which the same is adapted to be supported, said filter element including a helically wound member having spaced deposits of electrodeposited metal of uniform thickness disposed around the circumference of the wire forming each of the helices thereof to provide spaced areas of increased cross-section and so positioned as to be in abutting relation to the similar deposits upon each of the next adjacent helices when said filter element is subjected to axial compression so as to provide filtering passes between adjacent helices, and means having a fluid outlet therethrough for subjecting the filter element to axial compression and for closing the open end of the casing to confine the element within the latter.

2. A filter element of the character described, including a continuous metallic filter element coiled to provide a plurality of axially alined helices, and spacing members between said helices composed of spaced deposits of electrodeposited metal of uniform thickness deposited about the circumference of the metal forming said helices to provide spaced areas of greater cross-section than the normal cross-section of the helices forming the filter element, said spacing members being disposed in abutting relation to the spacing members on adjacent helices, whereby to provide filtering passes between each pair of said adjacent helices.

3. A filter element of the character described in which the portion of the element through which the liquid is filtered is formed by a continuous metallic member coiled to provide a plurality of juxtaposed convolutions of said metallic member and spacing members between said convolutions composed of spaced deposits of electrodeposited metal forming enlargements on a convolution to provide abutments spaced along the metal forming said convolutions and facing the adjacent convolution, said spacing members being so disposed that when the element is assembled, said abutments on juxtaposed convolutions contact and form filtering passes between adjacent convolutions.

4. In a filter, a casing having inlet and outlet means for a fluid to be filtered; an expandable and compressible metallic filter element disposed in said casing and providing a fluid passage therebetween, said filter element having a member arranged in convolutions having spaced deposits of electro-deposited metal disposed on the circumference of the member forming each of the convolutions thereof, said deposits providing spaced areas of increased cross-sections and so positioned as to be in abutting relation to the similar deposits upon each of the next adjacent convolutions when said filter element is subjected to compression so as to provide filtering passes between adjacent convolutions, and means for subjecting the filter element to compression to confine the element within said casing spaced therefrom and retained between said inlet and outlet means.

ALLAN C. HOFFMAN.